INVENTOR.
JOSEPH P. BOCARD,
RICHARD L. HARVIN AND
BERTRAND J. MAYLAND,
BY
ATTORNEYS.

Sept. 30, 1969     J. P. BOCARD ET AL     3,469,944
PROCESS AND APPARATUS FOR THE MANUFACTURE
OF HYDROGEN FOR FUEL CELLS Original Filed Jan. 31, 1964     2 Sheets-Sheet 2

INVENTOR.
JOSEPH P. BOCARD,
RICHARD L. HARVIN AND
BERTRAND J. MAYLAND,

BY

ATTORNEYS.

United States Patent Office 3,469,944
Patented Sept. 30, 1969

3,469,944
PROCESS AND APPARATUS FOR THE MANUFACTURE OF HYDROGEN FOR FUEL CELLS
Joseph P. Bocard, New Albany, Ind., Richard L. Harvin, Louisville, and Bertrand J. Mayland, Jeffersontown, Ky. (all % C & I/Girdler, P.O. Box 174, Louisville, Ky. 40201)
Continuation of application Ser. No. 341,628, Jan. 31, 1964. This application May 13, 1968, Ser. No. 730,980
Int. Cl. C01b 1/13, 1/27; B01j 7/00
U.S. Cl. 23—212         2 Claims

ABSTRACT OF THE DISCLOSURE

Process and apparatus for making hydrogen for fuel cells from liquid organic fuels of the type capable of being reformed in the range of 700° to 800° F., whereby the fuel is mixed with water, the mixture is vaporized by heat derived from the direct combustion of fuel, and the vaporized mixture is subjected to catalytic steam reformation in heat exchange relationship with the products of said combustion. The reformed gaseous mixture is conducted directly from the reforming apparatus to diffusion apparatus wherein the gaseous mixture is separated into substantially pure hydrogen and an impure gaseous fraction containing combustible values. These combustible values are used as part at least of the fuel for the above mentioned direct combustion. Means are provided whereby heat transfer is effected between the reforming apparatus and the diffusion apparatus, whereby the diffusion apparatus is maintained at a temperature substantially in the range of 600° to 800° F.

CROSS-REFERENCES TO RELATED APPLICATIONS

This application is a continuation of the copending case in the name of the same inventors, Ser. No. 341,628, filed Jan. 31, 1964 and now abandoned, and entitled Process and Apparatus for the Manufacture of Hydrogen for Fuel Cells.

BACKGROUND OF THE INVENTION

Field of the invention

This application has to do with the manufacture of hydrogen, and more particularly with the provision of a fuel supply for fuel cells.

Description of the prior art

The term "fuel cell" as employed herein means an electric cell which converts the chemical energy of a fuel directly into electric energy in a continuous process. Fuel cells generally comprise a suitable vessel containing an acid or an alkaline electrolyte and a pair of electrodes such as nickel or activated carbon. A suitable fuel in vaporized or gaseous form is introduced into the cell along with an oxidizing gas. The result of cell operation is combustion of the fuel, the energy of the combustion being transformed into electrical energy at an efficiency very much greater than the efficiency of systems in which the combustion produces heat which is transformed into mechanical energy by a heat engine, the mechanical energy being then used to drive an electrical generator. The details of the construction and operation of fuel cells as such do not constitute limitations upon this invention.

Fuel cells constitute a convenient, low cost and compact means for the generation of power, and are especially useful in confined spaces. Moreover, fuel cells have quick response, together with a relatively high turndown ratio; the operation of fuel cells is quiet; and depending upon the fuel, the problems involved in waste disposal can readily be overcome. There are, however, distinct problems in the provision of fuels for fuel cells. It is not yet possible to employ raw fuels such as gasoline or fuel oil for continuous operation. The ideal fuel is hydrogen; but the storage of a large quantity of pure hydrogen is undesirable because of inflammability and supply problems. The generation of hydrogen from suitable materials at a point adjacent the fuel cells is highly desirable, especially since liquid organic fuels provide considerably more energy per unit of volume than hydrogen itself, and liquid fuels are more easily and safely stored.

While the invention herein described is of general utility, one instance of its use is in submarines, where the problems solved by the invention are of especial importance. For convenience, the invention will be described in an embodiment which is adapted for use in a submarine, it being understood that the utility of the invention is not limited thereto.

Hydrogen may be generated from a wide variety of organic substances and preferably those capable of being reformed in the range of 700–800° F. including ethanol, benzene, toluene and the like; but for the purpose of an exemplary showing in this application, the process and apparatus will be described in connection with the use of methanol as a source of hydrogen. Methanol is readily available, is not excessive in cost, can be safely stored, and as produced does not contain appreciable quantities of substances like sulfur which would poison a catalyst used in a reforming reaction.

It is the basic purpose of this invention to provide a method and apparatus for the production of substantially pure hydrogen from methanol or related substances, which apparatus will be compact, simple, relatively inexpensive, and capable of continuous operation for long periods of time.

In the use of fuel cells in submarines or the like, it is frequently desired to control the cell output by increasing or decreasing the quantities of hydrogen and an oxidizing gas introduced into the cells. The cells themselves are capable of responding substantially instantaneously to such control measures; but if the storage of hydrogen as such is to be avoided, then it becomes necessary that the means for generating the hydrogen be capable of control and variations of the quantities of hydrogen generated. Hitherto such rapid response has not been characteristic of hydrogen generators as known in the art; and the present invention provides both means and a method for generating hydrogen, of such character that the quantity of hydrogen generated can be made very rapidly responsive to control operations as hereinafter set forth.

The present invention provides a means and method for the generating of hydrogen which is efficient, capable of wide output variation, and capable of variation in shape-space usage. The means and method of the present invention are quiet in operation and free of objectionable odors or waste materials. Only carbon dioxide need be disposed of, the remainder of the byproducts being burned as a heat source.

SUMMARY OF THE INVENTION

Briefly in the practice of the invention, methanol is subjected to catalytic reformation under non-adiabatic conditions. The mixed gases so produced are subjected to separation by diffusion in palladium diffusion cells which deliver a substantially pure hydrogen for use in the fuel cells and a mixed gaseous fraction containing certain fuel values which are utilized preferably in preheating the aqueous methanol feed stock. After the fuel values have been so consumed, the sensible heat in the effluent gases is employed to maintain the temperature of the reforming means including the catalyst therein. The effluent gases, which consist mainly of carbon dioxide, may then be disposed of in ways hereinafter pointed out.

The reactor devices and the palladium diffusion cells may be placed in a closely related assembly in an insulated vessel so as to conserve heat and provide a compact apparatus.

Where an immediate increase is desired in the amount of current developed at the fuel cells, provision is made for the injection of oxygen into the preheated stream of vaporized aqueous methanol feed stock passing to reforming means. The oxygen so introduced combines with some of the hydrogen and some of the carbon in the feed stock exothermically to produce heat and to prevent cooling in the catalyst beds, as would initially occur when the quantity of feed stock is concurrently stepped up to cause the fuel cells to deliver a greater electrical output. In this way, the apparatus is made substantially instantaneously responsive to an increased demand.

The exemplary form of the process comprises the following steps:

(a) Methanol and aqueous condensate are pumped together at a pressure of the order of 450 p.s.i.g. through a heat exchanger, and are then vaporized preferably in a methanol fired vaporizer.

(b) The vaporized and superheated methanol-water mixture (at a temperature of about 700° F.) is subjected to catalytic reformation while in heat exchange relationship with hot flue gases from the vaporizer. The temperature of the reformed gaseous mixture will be about 700° F.

(c) The gaseous mixture then flows to palladium diffusion cells which are also maintained at a temperature of about 700° F. Hydrogen diffuses through the palladium and the residual gas which does not so diffuse is burned in the fired vaporizer at a pressure of about 400 p.s.i.g.

(d) The purified hydrogen from the palladium diffusion cells at a pressure of about 5 p.s.i.g. flows through a methanator guard chamber or chambers and is finally saturated at about 140° F. for use in the fuel cells.

DESCRIPTION OF THE PREFERRED EMBODIMENTS

Figures 1, 4:
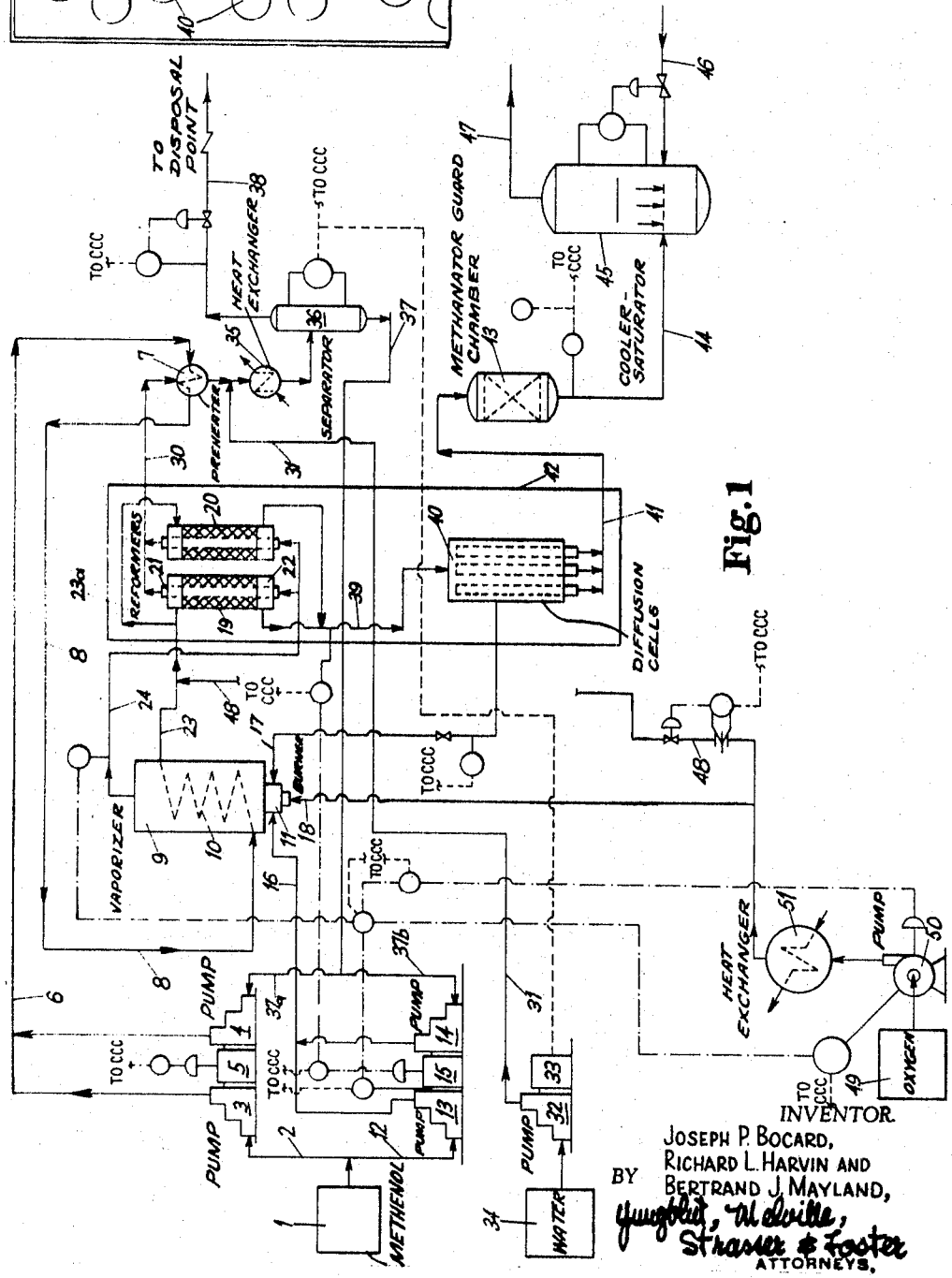
FIGURE 1 is a flow sheet diagram of an apparatus assembly which may be used in the practice of this invention.
FIGURE 4 is a partial view diagrammatically illustrating a compact arrangement of palladium cells and reformer devices.

Referring now to FIGURE 1, a methanol storage means 1 is connected by a conduit 2 to a methanol pump 3. There is also a process condensate feed pump 4. Both of the aforementioned pumps are driven by a motor 5, which may be various controlled but is preferably controlled by a computer control center CCC (not shown).

The methanol and the aqueous condensate flow through a conduit 6 and pass through a preheater 7, where the feed mixture is placed in heat exchange relationship to flue gases as hereinafter described. Thence, the feed stock passes through a conduit 8 to a vaporizer 9 containing an interior coil of stainless steel tubing 10 through which the feed stock passes. There is an outer casing on the vaporizer within which combustion may be maintained so as to heat the feed stock to a temperature of about 700° F.

The vaporizer includes burner means 11; and the fuel may be derived from two sources: i.e., methanol taken from storage and gases containing combustible values from the palladium diffusion cells. However, the vaporizer may, if desired, be heated by fuel from some other source.

The methanol storage means 1 is shown as connected by a branch conduit 12 to a feed pump 13 for the methanol used as fuel. There is also a fuel water injection pump 14, the two last mentioned pumps being driven by a motor 15 which is controlled as to its operation by the computer control assembly. The aqueous methanol mixture, which is the result of combining the outputs of the two pumps 13 and 14, is delivered by a conduit 16 to the burner 11. The gases containing combustible values from the palladium diffusion cells are delivered to the burner 11 by conduit 17. Oxygen for combustion is delivered to the burner through a conduit 18.

Where a disposal problem is encountered, and irrespective of the nature of the fuel, combustion in the vaporizer could be carried on at high pressure, say, 400 p.s.i. This will result in high pressure carbon dioxide in the line 38, permitting easier disposal as in the case of a submarine. It will be understood that in order to vent a gas from a submerged submarine, the gas must be at a pressure greater than the pressure of the surrounding water. Such pressure could be attained by the use of an exit compressor. This not only entails expense, however, but is undesirable from the standpoint of added noise. Conducting the combustion at high pressure avoids these difficulties; and a pressure of about 400 p.s.i. will normally be adequate.

In FIGURE 1 the index numerals 19 and 20 indicate broadly catalytic reforming devices. These devices, of which there may be as many as required for the desired capacity, are made up of an inner tube 21 and an outer tube 22, there being an annular space between the tubes which is filled with the catalyst material. It will be seen from FIGURE 1 that the vaporized feed stock from the element 9 passes by means of conduits 23 and 23a to the annular catalyst-filled spaces of the reformers. Flue gases from the vaporizer 9 are delivered through a branch conduit 24 to the inner tube elements 21.

Figure 2:
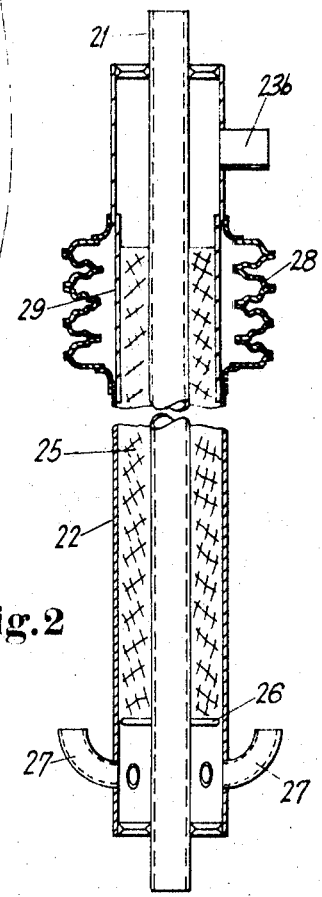
FIGURE 2 is a longitudinal section of a type of catalytic reformer which may be employed.

The reformer devices in a preferred embodiment are detailed in FIGURE 2. The inner tube for flue gases is again indicated at 21 and the outer tube at 22. The annular space between the tubes is filled with catalyst material 25, which rests on a lower support 26. The annular space between the tubes is closed off at the top and bottom as shown. At the top there is an inlet means 23b for the vaporized feed stock, while in the bottom portion of the outer tube and below the support 26 there are one or more L's 27 for the exit of the gases which have been subjected to reformation. In order to take care of any differences in expansion and contraction of the inner and outer tubes, it is preferred to provide the outer tube with bellows 28 or other suitable means to take up expansion. An interior shield 29 may be provided along the bellows area to hold the catalyst in place. The maintenance of a heat exchange relationship between the flue gases in the tube 21 and the gases and catalyst in the annular space within the tube 22 compensates for the loss of heat in the endothermic reforming reaction. If it were not for this heat exchange, it would be necessary to preheat the feed stock in the vaporizer to a temperature of about 1400° F. It may be noted that when connections are made as indicated in FIGURE 1, the flow of the flue gases in the tube 21 is countercurrent to the flow of the gases in the annular space within tube 22.

Referring again to FIGURE 1, the flue gases are withdrawn from the inner tubes of the several reformers through a conduit 30 and pass to the heat exchanger 7 previously mentioned, wherein they serve to preheat the methanol-water feed stock before it reaches the vaporizer 9. The flue gases are appreciably cooled by the heat exchanger 7 so that condensate will form therein. The condensate formed in the heat exchanger 7 is combined with fresh condensate from a storage tank 34 which is pumped through conduit 31 by pump 32. The pump is driven by a motor 33 which is controlled as to its operation by the computer control assembly.

The flue gases are then preferably further cooled by means of circulating water in a second heat exchanger 35, which will preferably cool the flue gases to a temperature not greater than about 95° F., and result in the formation of additional condensate. A separator 36 serves to remove substantially all of the water from the flue gases in the form of a condensate which is delivered by a conduit 37 to conduit branches 37a and 37b, which feed condensate respectively to pumps 4 and 14. The gaseous fraction from the separator 36 (consisting substantially entirely of carbon dioxide) is carried to a disposal point by a conduit 38, where it may be disposed of in ways hereinafter outlined.

The gaseous effluent from the reformer means is carried by a branched conduit 39 directly to a plurality of hydrogen purifier cells 40. As hereinabove set forth, these cells are preferably palladium diffusion cells. That is to say, vessels or tubes each containing a substantial number of capillary tubes made of palladium silver alloy, these last mentioned tubes having an independent connection to a conduit 41 for the purified hydrogen.

The showing of a hydrogen purifier cell in FIGURE 1 is purely diagrammatic. The palladium cells are arranged in an interdigitated relationship with the reformer devices so that there will be heat exchange between the two. It so happens that the optimum operating temperature level of the palladium cells will generally fall between 600° and 800° F., i.e. the best temperature for diffuser cell operation will be substantially the same as the temperature of the outer tube of the reformer device. The reformer devices and palladium diffusion cells in interdigitated or nested relationship are preferably placed in a single insulated housing, and packed therein in some form of loose insulation. This is diagrammatically illustrated by the indication at 42 of an insulated housing or enclosure in FIGURE 1. It is also within the scope of the invention to arrange the palladium cells in circles about the reformer devices. This is shown diagrammatically in FIGURE 4. The elements shown in FIGURE 4 have been given the same index numerals as the corresponding elements of FIGURE 1. An arrangement such as that shown in FIGURE 4 results in a considerable saving of space.

The gases coming from the reformer devices will generally contain approximately 55% hydrogen, 16% carbon dioxide, 25% water vapor, 4% carbon monoxide and small amounts of methane and methanol. Gases of substantially this composition enter the tubes or casings of the hydrogen purifier cells. When operated under the proper condition of temperature, the action of the cells will be to separate substantially pure hydrogen from the other gases in the mixture set forth above. The pure hydrogen will be withdrawn from the interiors of the capillary tubes in the conduit 41, while the remaining gases will be sent back via the conduit 17 to the burner 11. In one installation it was found that about eight palladium cells were required to handle the gaseous product from each concentric tube reformer. It would be possible by removing carbon dioxide from the reformed gases and by condensing and removing water therefrom, to use fewer of the palladium diffusion cells, but this would require extra steps of heating and cooling, and additional apparatus. Moreover, it would tend to render the apparatus less promptly responsive to increased demands.

In order to protect the fuel cells from the deleterious effect of carbon monoxide (should any of it escape into the conduit 41), it is preferred to pass the hydrogen through a methanator guard chamber 43. This may be a vertical cylindrical pressure vessel containing a methanation catalyst. This will eliminate any but traces of carbon monoxide.

The pure hydrogen effluent from the methanator 43 flows through a conduit 44 to a direct contact cooler-saturator 45. This may be a vertical, cylindrical pressure vessel in which a predetermined water level can be maintained automatically. The water may be derived from a conduit 46 carrying excess water from fuel cells (not shown). The hydrogen from the methanator is introduced into the cooler-saturator 45 near the lower part thereof; and the saturated purified hydrogen at about 5 p.s.i.g. and at about 140° F. is drawn off through a conduit 47 for use in the fuel cells. Other conditions of temperature and saturation could be used.

In FIGURE 1 there are shown various control valves, temperature recorders, pressure control devices and like elements which are not believed to require specific description and will be recognized by the skilled worker in the art. Dotted line connections indicate electrical connections, while dot-dash line connections indicate instrument air. Wherever the legend "to CCC" occurs, a connection to the computer control center will be understood.

In the apparatus as thus far described, if an increase in rate were desired, and a greater quantity of feed stock were sent through the vaporizer 9, it would be expected that the temperature would fall in the vaporizer. Likewise, there would be insufficient heat in the catalyst, and the net production of hydrogen would not increase immediately. This lack of immediate response may be overcome by injecting oxygen into the vaporized feed stock through a connection to conduit 23 indicated at 48. As the oxygenated feed stock passes through the reformer devices, a catalytic partial combustion will take place, supplying the required heat for reforming at the increased rate. The catalyst in the reformers will be called upon to promote a number of reactions simultaneously, e.g. (a) oxidation, (b) decomposition of methanol, and (c) the water gas shift reaction. A suitable nickel containing catalyst will serve all of these purposes. However, it is possible within the purview of the invention to introduce oxygen in such a way as to carry on non-catalytic combustion ahead of the reformer devices.

The oxygen employed can be derived from the liquid oxygen storage 49 of the submarine through an oxygen pump 50, the outlet of which feeds both the conduit 18 to the burner and the conduit 48 to the feed stock inlet to the reformers. For the sake of simplicity, the two parts of conduit 48 have not been shown as connected in FIGURE 1; but the skilled worker in the art will understand that the conduit 48 is continuous. The oxygen introduced into the system will generally be preheated by a heat exchange device 51.

The carbon dioxide derived in the conduit 38 may be disposed of in various ways. It can be vented from the submarine as a gas, under circumstances which will permit such venting. Otherwise, it can be liquefied by cryogenic cooling with the liquid oxygen supply of the vessel, stored, and subsequently eliminated.

Figure 3:
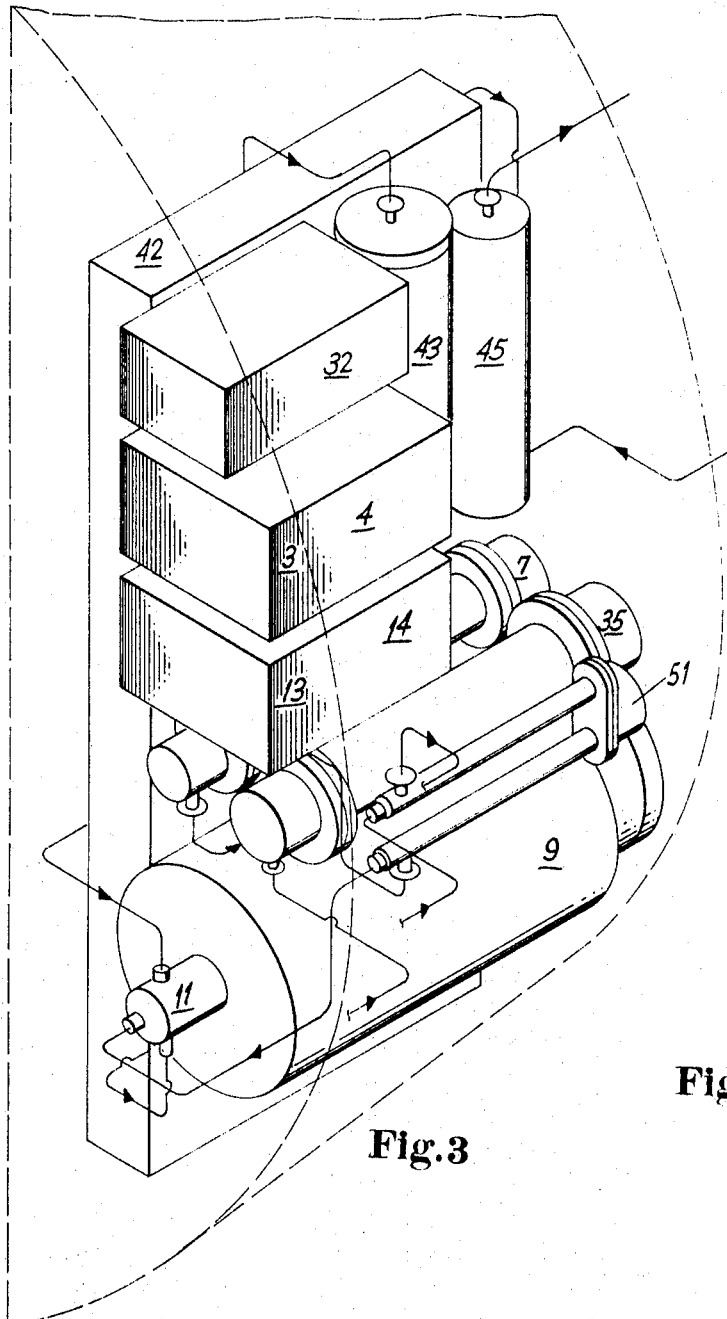
FIGURE 3 is a diagrammatic illustration of a compact arrangement of apparatus elements used for the practice of the invention in a restricted space.

FIGURE 3 shows a compact unit for the use described comprising the parts hitherto set forth.

A housing 42 contains the reformer and hydrogen purifier cell units. Otherwise, the elements shown in FIGURE 3 have been given the same index numerals as the corresponding elements of FIGURE 1. The entire apparatus is exceedingly compact and is not likely to get out of order.

Modifications may be made in the invention without departing from the spirit of it. Some fuel other than methanol may be used if desired to heat the vaporizer 9, but there is generally little advantage in such use, and the products of combustion may be more difficult to dispose of.

Accordingly, no limitations are intended except insofar as specifically set forth in the claims which follow.

The embodiments of the invention in which an exclusive property or privilege is claimed are defined as follows:

1. In the process of making hydrogen for fuel cells from methanol, the steps of mixing said methanol with water, at a pressure of about 450 p.s.i.g., vaporizing the mixture by heat derived from the direct combustion of fuel, the vaporized methanol-water mixture being heated during vaporization to a temperature of about 700° F., conducting said vaporized mixture to reforming apparatus, subjecting the vaporized mixture in said reforming apparatus to catalytic steam reformation in heat exchange relationship with the products of said combustion, maintaining said vaporized mixture at a temperature of from 700° to 800° F. during the said steam reformation, and introducing oxygen into the vaporized mixture concurrently with increasing the flow of the mixture through the apparatus in which the steam reformation is carried on whereby to produce a greater quantity of hydrogen without substantial time lag, then conducting the reformed gaseous mixture directly from said reforming apparatus to diffusion apparatus at a pressure of about 400 p.s.i.g., subjecting the reformed gaseous mixture to purification in said diffusion apparatus whereby to separate the gaseous mixture into substantially pure hydrogen and an impure gaseous fraction containing combustible values, using the said combustible values as part at least of the fuel for said direct combustion, and effecting heat transfer between said apparatus in which said steam reformation is conducted and said diffusion apparatus whereby said diffusion apparatus is maintained at a temperature of from about 600° to about 800° F.

2. In the process of making hydrogen for fuel cells from methanol, the steps of mixing said methanol with water, at a pressure of about 450 p.s.i.g., vaporizing the mixture by heat derived from the direct combustion of fuel, the vaporized methanol-water mixture being heated during vaporization to a temperature of about 700° F., conducting said vaporized mixture to reforming apparatus, subjecting the vaporized mixture in said reforming apparatus to catalytic steam reformation in heat exchange relationship with the products of said combustion, maintaining said vaporized mixture at a temperature of from 700° to 800° F. during the said steam reformation, and introducing oxygen into the vaporized mixture concurrently with increasing the flow of the mixture through the apparatus in which the steam reformation is carried on whereby to produce a greater quantity of hydrogen without substantial time lag, conducting the reformed gaseous mixture directly from said reforming apparatus to diffusion apparatus at a pressure of about 400 p.s.i.g., subjecting the reformed gaseous mixture to purification in said diffusion apparatus whereby to separate the gaseous mixture into substantially pure hydrogen and an impure gaseous fraction containing combustible values, using the said combustible values as part at least of the fuel for said direct combustion, and effecting heat transfer between said apparatus in which said steam reformation is conducted and said diffusion apparatus whereby said diffusion apparatus is maintained at a temperature of from about 600° to about 800° F., including also the step of cooling the products of said direct combustion so as to recover water therefrom, leaving for disposal a gas consisting essentially of carbon dioxide, and employing recovered water, in part at least, for mixing with additional quantities of methanol.

References Cited

UNITED STATES PATENTS

| | | | |
|---|---|---|---|
| 2,425,625 | 8/1947 | Larson | 23—212 |
| 2,700,598 | 1/1955 | Odell | 48—105 XR |
| 2,756,121 | 7/1956 | Grimes | 252—373 XR |
| 2,829,113 | 4/1958 | Barry et al. | 252—376 |
| 2,961,062 | 11/1960 | Hunter et al. | |
| 3,012,086 | 12/1961 | Vahldieck | 136—86 |
| 3,088,919 | 5/1963 | Brown et al. | 252—373 |
| 3,179,500 | 5/1965 | Bowen et al. | 23—212 |

LEON ZITVER, Primary Examiner

H. T. MARS, Assistant Examiner

U.S. Cl. X.R.

23—260; 48—214, 89, 94, 197; 252—373